UNITED STATES PATENT OFFICE.

LOUIS SCHULTZ, OF BUFFALO, NEW YORK.

IMPROVED MEDICAL COMPOUND.

Specification forming part of Letters Patent No. 47,750, dated May 16, 1865.

*To all whom it may concern:*

Be it known that I, LOUIS SCHULTZ, of Buffalo, in the county of Erie and State of New York, have invented a new and useful Medical Compound which I denomite "Malt Extract;" and I do hereby declare that the following is a full and exact description thereof, and of the manner of using the same.

My malt extract is composed of malt, hops, onions, and Irish and Iceland moss, and possesses medicinal qualities in the form of a pleasant beverage, as will hereinafter be more fully described.

The following are the proportions and quantities required of each material for making a barrel of thirty-one gallons of the extract, and the direction for preparing the same: Four bushels of malt at thirty-two pounds per bushel, four ounces of hops, six ounces of onions, four ounces of Irish moss, eight ounces of Iceland moss. The malt being ground in the usual manner is first "mashed" by pouring upon it eighteen gallons of water heated to a little above 110° Fahrenheit, so as to bring the mash or mixture to about that temperature. After standing thirty minutes a second mash is prepared by adding to the first thirty-eight gallons of water at 167°, so as to bring the mixture up to a temperature of about 140°, thoroughly stirring the same, when it is allowed to stand for one hour to saccharify or convert the starch contained in the malt into starch sugar. The mash is then brought up to a temperature of 160° or thereabout by the addition of twenty-four gallons of boiling water, again well stirring up the mixture, when the mash tun or tub should be covered up and a second time left for one hour, when the clear infusion is drawn off into a copper or other suitable vessel, and boiled or evaporated to the required quantity, (which in this case is thirty-one gallons,) the other ingredients, prepared as hereinafter described, to be stirred into the liquid an hour before the boiling is completed. The mosses are prepared by boiling the Iceland moss in two quarts of water, and then pouring it on the Irish moss, when by standing twenty-four hours they become converted into a mucilage or jelly. This jelly with the hops and the onions bruised or cut fine are then introduced into the boiling liquid as before stated. When this liquid compound is sufficiently evaporated, as before described, it is cooled to about 50°, when it is put into barrels for clearing, or the deposit of what sedementary matter it may contain, avoiding all fermentation as much as possible.

After remaining in the barrels usually about two weeks (more or less according to the weather) the extract becomes clear, when it is ready for bottling for market and use.

The quantity of hops, onions, Irish and Iceland moss may be increased or even doubled, and their proportions somewhat varied, without impairing the compound, the only difference in the result being a more concentrated preparation requiring smaller doses.

My malt extract is designed as a medicine in the form of an agreeable beverage, operating as a gentle stimulant and tonic in cases of general debility, dyspepsia, &c., imparting a more healthy tone and increased activity to the system generally. It is also recommended for colds, coughs, and other pectoral affections, acting as an expectorant and demulcent, allaying irritation of the mucous membranes. For patients much enfeebled, and for coughs, hoarseness, &c., the compound should be boiled for ten minutes, and the foam skimmed off, when for an ordinary dose a wine-glassful may be taken morning and evening. By those not so much reduced it may be taken three times per day in somewhat larger doses and without boiling.

What I claim as my invention, and desire to secure by Letters Patent, is—

A medical compound composed of the ingredients herein mentioned, combined substantially in the manner and proportions herein set forth.

In witness whereof I have hereunto signed my name in the presence of two subscribing witnesses.

LOUIS SCHULTZ.

Witnesses:
LYMAN P. PERKINS,
ANSEL W. BATES.